US005671144A

United States Patent [19]
Ryan et al.

[11] Patent Number: 5,671,144
[45] Date of Patent: Sep. 23, 1997

[54] COMBINED POWER LIMITING AND POWER DISTRIBUTING TRACTION CONTROL SYSTEM FOR IMPROVING VEHICLE PERFORMANCE IN TURNS

[75] Inventors: Thomas B. Ryan, Webster; Robert K. Holzwarth, Scottsville; Kenneth A. May, Churchville, all of N.Y.

[73] Assignee: Zexel Torsen Inc., Rochester, N.Y.

[21] Appl. No.: 432,950

[22] Filed: May 1, 1995

[51] Int. Cl.$^6$ .................................................. B60K 28/16
[52] U.S. Cl. ........................ 364/426.029; 364/426.034; 364/424.098; 180/197
[58] Field of Search ................... 364/426.01, 426.02, 364/426.03, 424.098, 426.027, 426.029, 426.031, 426.034, 426.037; 180/197, 233, 248

[56] References Cited

U.S. PATENT DOCUMENTS

| | | | |
|---|---|---|---|
| 4,762,196 | 8/1988 | Harada et al. | 180/197 |
| 4,884,650 | 12/1989 | Fujiki et al. | 180/197 |
| 4,981,190 | 1/1991 | Nakayama et al. | 180/197 |
| 5,002,147 | 3/1991 | Tezuka et al. | 180/197 |
| 5,004,064 | 4/1991 | Tezuka et al. | 180/197 |
| 5,117,934 | 6/1992 | Tsuyama et al. | 180/197 |
| 5,122,101 | 6/1992 | Tseng | 475/252 |
| 5,159,991 | 11/1992 | Tsuyama et al. | 180/197 |
| 5,163,530 | 11/1992 | Nakamura et al. | 180/197 |
| 5,213,177 | 5/1993 | May | 180/197 |
| 5,244,440 | 9/1993 | Ichiki et al. | 475/252 |
| 5,257,857 | 11/1993 | Okazaki | 303/103 |
| 5,269,390 | 12/1993 | Glover et al. | 180/197 |
| 5,270,930 | 12/1993 | Ito et al. | 364/426.03 X |
| 5,293,315 | 3/1994 | Kolbe et al. | 364/426.02 |
| 5,315,519 | 5/1994 | Chin et al. | 364/426.02 |
| 5,320,422 | 6/1994 | Tsuyama et al. | 303/110 |
| 5,431,241 | 7/1995 | May et al. | 180/197 |
| 5,524,080 | 6/1996 | May | 364/426.03 |
| 5,540,299 | 7/1996 | Tohda et al. | 180/243 |

OTHER PUBLICATIONS

"Analysis of Traction Control Systems Augmented by Limited Slip Differentials" by R.K. Holzwarth and K.A. May, Reprinted, from: ABS/TCS and Brake Technology Developments (SP-1018), SAE Technical Paper Series, 940831, pp. 53-61, 1994.

*Primary Examiner*—Collin W. Park
*Attorney, Agent, or Firm*—Eugene Stephens & Associates

[57] ABSTRACT

A traction control system combines a power limiting system having multiple operating modes with a power distributing system that resists differentiation between drive wheels. Sensors monitor vehicle turning, differentiation between the drive wheels, and wheel slipping of at least one drive wheel. The operating mode of the power limiting system is changed to reflect additional traction information available from monitoring the state of differentiation through turns.

39 Claims, 6 Drawing Sheets

COMBINED POWER LIMITING AND POWER DISTRIBUTING TRACTION CONTROL SYSTEM FOR IMPROVING VEHICLE PERFORMANCE IN TURNS

TECHNICAL FIELD

The invention relates to the field of vehicle traction control in which drive power is regulated to limit wheel slipping.

BACKGROUND

Traction control systems of motor vehicles limit wheel slipping in which one or more drive wheels overrun their traction surfaces. Slipping occurs when more torque is applied to a drive wheel than can be withstood by its traction surface for correspondingly moving the vehicle. The excess torque causes a sudden increase in drive wheel rotational speed with respect to its traction surface, referred to herein as wheel slipping.

Traction, which is measured as a force, is a function of wheel slip, which is measured as a percentage of overall drive wheel rotation in excess of rolling contact with the traction surface. A small percentage of wheel slip is needed to fully exploit the available traction force, but larger percentages of wheel slip reduce the traction force. Accordingly, wheel slipping, i.e., large percentages of wheel slip, actually reduces the amount of power that can be used to move a vehicle.

Traction control systems regulate drive power to the drive wheels by limiting the total drive power reaching the drive wheels or by influencing the distribution of drive power between the drive wheels. Power limiting systems regulate the delivery of power to a group of drive wheels, and power distributing systems divide the power in different proportions between the drive wheels.

Power limiting systems include engine output power limiting systems and drive line power limiting systems. The engine output power limiting systems regulate the delivery of drive power by controlling various engine functions including ignition, air intake, fuel intake, and exhaust. Engine controllers already regulate some or all of these functions, so little additional hardware is required to implement traction control. However, throttle controls are often preferred for directly overriding operator commands to the engine. The drive line power limiting systems interrupt the flow of power between the engine and the drive wheels by applying a braking force to the drive line or by temporarily disconnecting it.

Power distributing systems include active or passive power distributing differentials that influence the distribution of drive power between drive wheels. Active power distributing differentials have external controls that vary either frictional resistance to relative rotation between drive wheels (i.e., differentiation) or the speed ratio at which they are interconnected. Passive power distributing differentials develop frictional resistance to differentiation as a function of either the amount of differentiation or the amount of torque being transmitted.

Both power limiting systems and power distributing systems are needed to best exploit available traction. Power limiting systems resist either or both drive wheels from slipping but do not exploit traction differences between the drive wheels. Power distributing systems resist one drive wheel from slipping in advance of another by distributing more torque to the drive wheel having better traction but do not prevent both drive wheels from slipping together.

Wheel braking systems have been used for both limiting the total drive power reaching the drive wheels and varying the distribution of the drive power between the drive wheels. However, the wheel brakes are not well suited for performing either function. The application of individual wheel brakes can produce shocks in the drive line or reflect excess torque between drive wheels resulting in drive line instabilities known as "hunting". Use of the wheel brakes for traction control accelerates their wear. Engine output power can often overwhelm the power-absorbing capacities of the wheel brakes. The application of the wheel brakes requires the generation of fluid pressure and its controlled conversion into mechanical braking torques, which can delay appropriate braking responses.

U.S. Pat. No. 5,269,390 to Glover et al. discloses a traction control system that combines an engine output power limiting system with a passive power distributing differential. Wheel slip is measured, and the engine output power limiting system reduces the drive power with respect to operator demand in response to a measure of wheel slip above a threshold. The passive differential is of the viscous coupling type that generates frictional torque opposing high rates of differentiation. The threshold is set to a much higher target value when only one drive wheel is slipping to allow the limited-slip differential to operate properly.

However, viscous coupling type differentials only oppose high rates of wheel slip, and this limits the traction force available to the slipping drive wheel. The additional torque that can be delivered to the non-slipping wheel is also limited by activation of the engine output power limiting system at the higher target value of wheel slip. On the other hand, the higher target value delays any needed response of the engine output power limiting system to excessive wheel slip.

Torque proportioning differentials, which develop frictional resistance to differentiation in proportion to the torque transmitted by the differentials, have also been proposed for use with engine output power limiting systems. One example is disclosed in U.S. Pat. No. 5,524,080 to one of the present coinventors and is hereby incorporated by reference. The above patent proposes changes to the engine output power limiting systems to more fully utilize the differential's ability to control torque distributions without impairing the engine output power limiting system's ability to limit excessive wheel slip.

Our present invention is based in part on a recognition that torque proportioning differentials, as well as other differentials or systems that resist differentiation, can provide information for enhancing performance of power limiting systems. The information is readily available from analysis of wheel speeds but is independent of measures of wheel slip.

Torque proportioning differentials develop a potential for frictional resistance to differentiation between a pair of drive wheels as a proportion of the amount of torque transmitted to the drive wheels. The resistance to differentiation can compensate for uneven amounts of traction available to a pair of drive wheels by preventing the drive wheels from rotating at different speeds until torque is divided between the drive wheels in a predetermined proportion referred to as a "bias ratio".

While differentiating, torque proportioning differentials divide drive torque between drive wheels at the bias ratio with the slower rotating drive wheels receiving the greatest amount of the drive torque. For example, the slower rotating (inside) drive wheel in a turn receives more torque than the faster rotating (outside) drive wheel. Since the drive torque is shifted away from the outside drive wheel, there is little tendency for this wheel to spin, especially because vehicle roll also provides outside wheels with more traction. Before the inside drive wheel can start slipping, differentiation must first cease and the greater portion of the drive torque must be shifted away from the inside wheel until torque is divided in favor of the outside drive wheel at the bias ratio.

Accordingly, differentiation consistent with the turning direction is a good indication that inside wheel slipping is unlikely under present traction conditions. In other words, differentiation indicates that substantially more than one-half of the drive torque is being sustained by prevailing traction conditions of the inside drive wheel. Bias ratios are usually in the range of at least two-to-one, and this means that total drive torque could double or inside wheel traction could drop in half without spinning the inside wheel.

Torque proportioning differentials also provide advance warning of relatively deteriorating traction conditions. When traction conditions of the inside drive wheel are not sufficient to sustain the bias ratio, differentiation ceases and the excess drive torque is shifted away from the inside drive wheel. The required torque reduction to the inside wheel occurs automatically and much faster than could be effected by a conventional power limiting system that reduces power to both drive wheels. However, the cessation of differentiation can be interpreted by the power limiting system to mean that a much lower margin of overall traction is available.

SUMMARY OF INVENTION

Our invention combines a power limiting traction control system with a power distributing traction control system in a way that exploits unique characteristics of the power distributing system to enhance performance of the power limiting system. Overall vehicle traction performance is improved in turns by modifying the power limiting system to respond to additional traction information that is evident from reactions of the power distributing system.

One example of our invention includes a power limiting system that regulates drive power to a pair of drive wheels and a power distributing system that divides the drive power between the drive wheels. The power limiting system has a plurality of operating modes for responding to changing vehicle operating conditions, and the power distributing system is arranged to resist relative rotation between the drive wheels (i.e., differentiation) for unevenly dividing drive torque between the drive wheels.

Sensors detect states of (a) vehicle turning, (b) relative rotation between the drive wheels (differentiation), and (c) wheel slipping of at least one drive wheel. Accompanying detection of vehicle turning and a lack of detection of wheel slipping, a logic system modifies a control signal to the power limiting system to reflect the state of relative rotation between the drive wheels. The operating modes of the power limiting system are changed by the control signal in response to different states of relative rotation between the drive wheels.

The power limiting system includes at least two operating modes applicable to conditions of vehicle turning without wheel slipping. A first of the operating modes enables the delivery of additional drive power to the drive wheels, and a second of the operating modes provides for relatively limiting the delivery of additional drive power to the drive wheels. The first operating mode is entered in response to the detection of differentiation reflecting an assumption of additional traction available. The second operating mode is entered in response to the cessation of differentiation reflecting an assumption that one of the drive wheels has reached a limit of the available traction.

Differences between the two operating modes of the power limiting system can vary widely for making different use of the additional traction information. For example, sensitivity of the power limiting system to given measures of wheel slip can be varied between operating modes to allow for the use of additional drive power in turns while reacting more quickly to the onset of wheel slipping. The additional traction information can also be used for performing preemptive procedures for avoiding the onset of wheel slipping.

DRAWINGS

DETAILED DESCRIPTION

Figure 1:
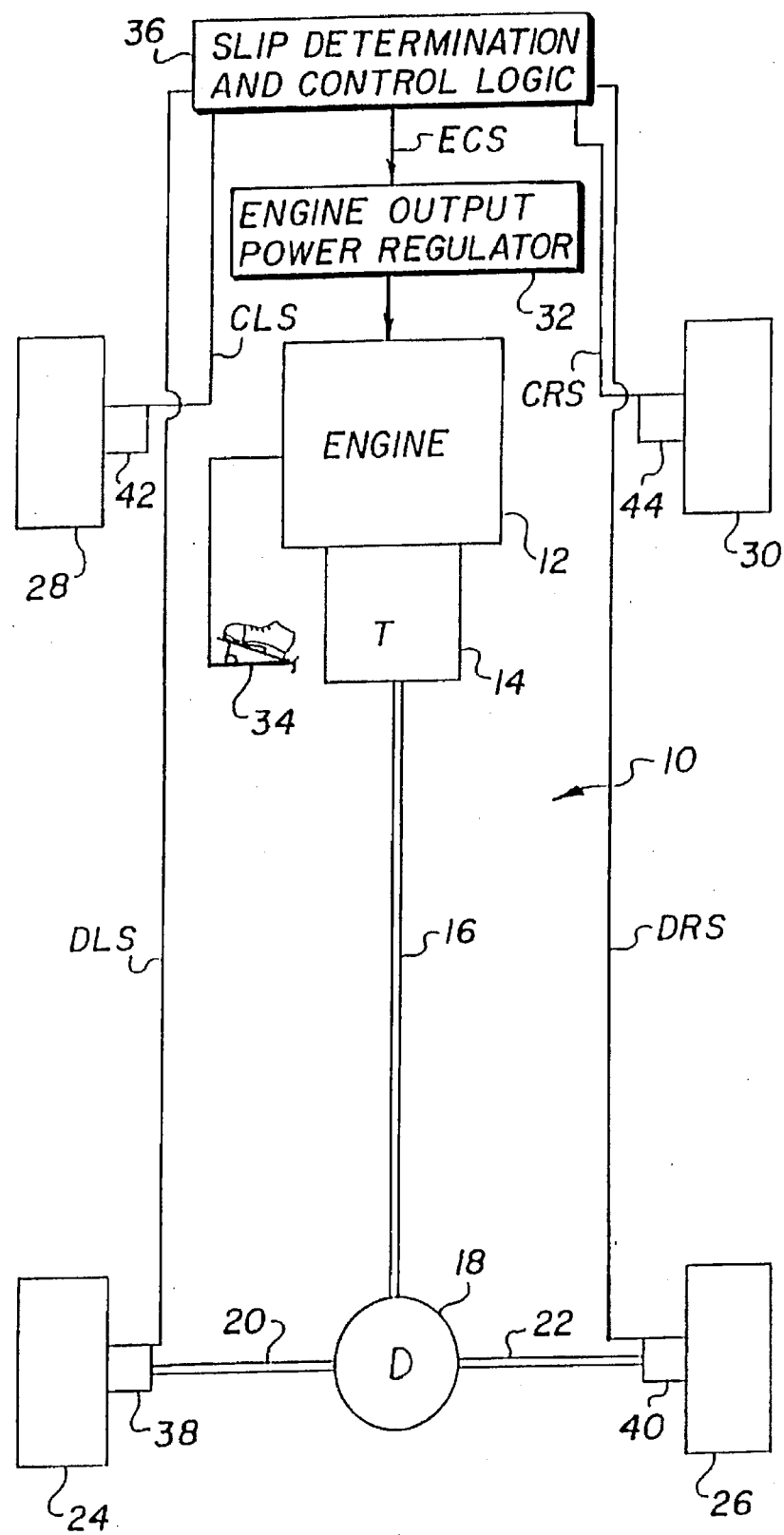
FIG. 1 is a block diagram of our new traction control system connected to a vehicle drive train.

Our new traction control system is illustrated in FIG. 1 together with a vehicle drive train 10, which starts with an engine 12 that provides a source of drive power. A transmission 14 and a drive shaft 16 transmit the drive power to a differential 18 that divides the drive power between a pair of relatively rotatable axle halves 20 and 22. Left and right drive wheels 24 and 26 are coupled to the respective axle halves 20 and 22. Left and right non-driven or coast wheels 28 and 30 rotate independently of the drive train.

Although for ease of layout the drive train 10 is arranged for a rear wheel drive vehicle, the invention is equally applicable to front wheel drive vehicles. The invention can also be applied to all wheel drive vehicles or other multi-axle drive vehicles in which drive power is divided between pairs of drive wheels.

The differential 18, which provides a power distributing system, resists relative rotation (i.e., differentiation) between the axle halves 20 and 22. Preferably, the differential is a passive device, such as a torque proportioning differential that develops a frictional resistance to differentiation as a proportion of the torque transmitted between the drive shaft 16 and the axle halves 20 and 22. This torque proportioning characteristic is more commonly expressed as a "bias ratio", which is a ratio of the respective amounts of torque in the axle halves 20 and 22. The bias ratio of differential 18 is preferably at least 1.5 to 1, with 2 to 1 being more preferred.

While differentiating, torque is divided between the axle halves 20 and 22 in accordance with the bias ratio. However, while not differentiating, torque can be divided in any lesser ratio up to the bias ratio. Once one of the drive wheels 24 and 26 has exhausted all of its available traction, additional torque is diverted to the other of the drive wheels 24 and 26 until the traction available to the other drive wheel is also exhausted and both drive wheels begin slipping or the bias ratio is reached and the lower traction drive wheel begins slipping.

While a variety of differentials, such as limited-slip or torque proportioning differentials, could be used to provide resistance to differentiation, parallel-axis gear differentials such as described in coassigned U.S. Pat. Nos. 5,122,101 and 5,244,440 are preferred. Both of these patents are hereby incorporated by reference.

An engine output power regulator 32, which provides a power limiting system, overrides an operator demand 34 for drive power and limits the amount of drive power that is delivered to the differential 18 for distribution to the drive wheels 24 and 26. The engine output power regulator 32 can be arranged to regulate the generation of drive power by controlling engine functions such as ignition, air intake, fuel intake, or exhaust or by interrupting the flow of drive power to the differential 18 such as by braking the engine 12.

A coassigned U.S. Pat. No. 5,431,241, in which two of us are named coinventors and which is hereby incorporated by reference, discloses a traction control system combining an engine brake with an engine output power regulator. The combination of both forms of power limiting provides for improved response time.

Slip determination and control logic 36 provides for detecting drive wheel slip and for producing commands for controlling the engine output power regulator 32. Although other methods can be used for detecting wheel slip, such as disclosed in U.S. Pat. No. 5,213,177, in which one of us is the named inventor and which is also hereby incorporated by reference, a more conventional approach employing individual wheel speed sensors 38, 40, 42, and 44 is preferred for the practice of this invention.

Figure 2:
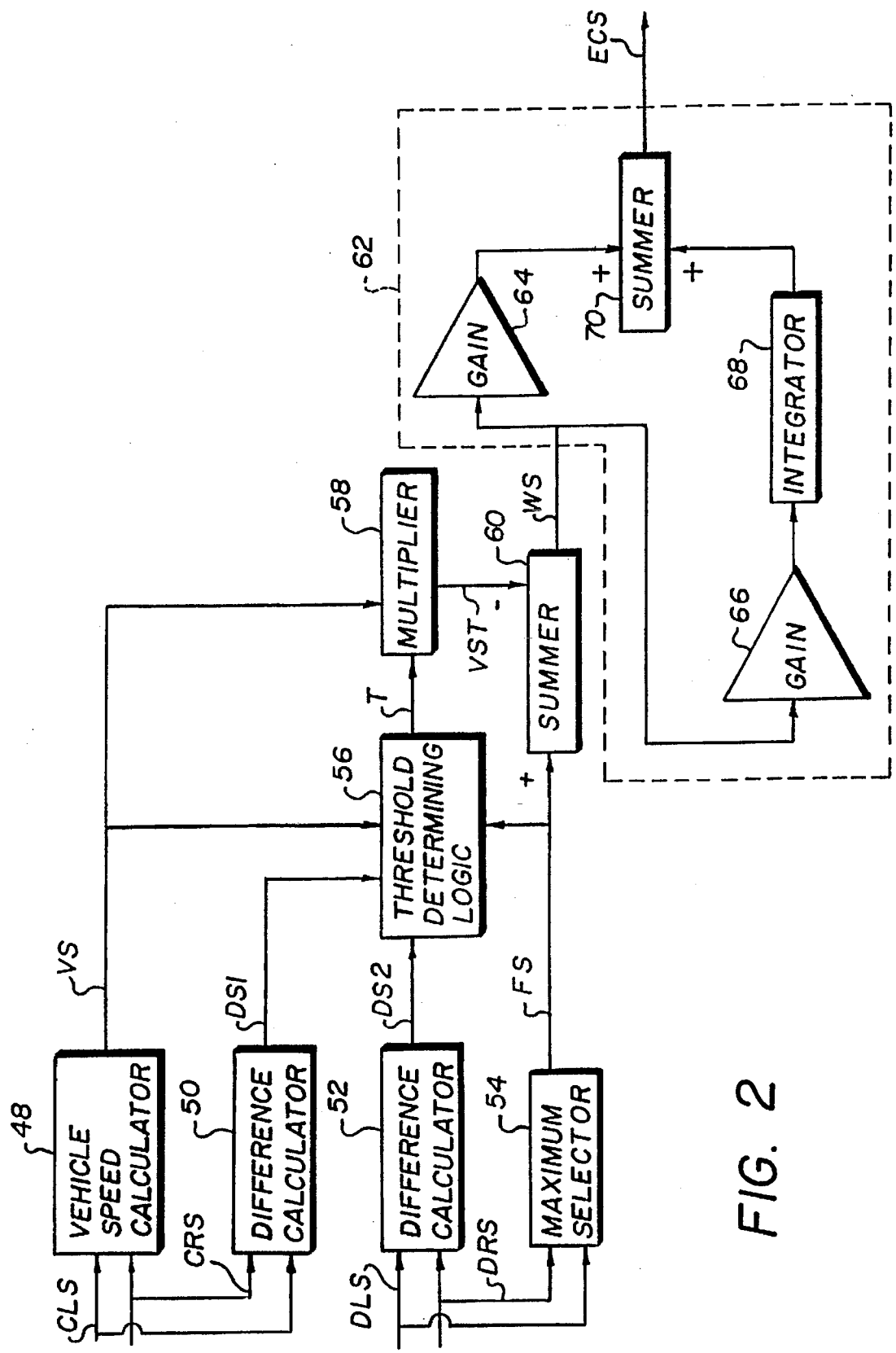
FIG. 2 is block diagram of functions performed by slip determination and control logic for controlling an engine output power regulator.

Referring also to FIG. 2, the wheel speed sensors 38 and 40 produce signals "DLS" and "DRS" representing the respective speeds of the left and right drive wheels 24 and 26, and the wheel speed sensors 42 and 44 produce signals "CLS" and "CRS" representing the respective speeds of the left and right coast wheels 28 and 30. A vehicle speed calculator 48 receives the signals "CLS" and "CRS" and outputs a signal "VS" representing vehicle speed in units of wheel rotation. A first difference calculator 50 also receives the signals "CLS" and "CRS" and outputs a signal "DS1" representing a difference in speed between the coast wheels 28 and 30—an indication of vehicle turning. Other sensors could also be used for detecting vehicle turning such as by measuring lateral acceleration or steering wheel angle.

Both a second difference calculator 52 and a maximum selector 54 receive the signals "DLS" and "DRS". The second difference calculator 52 outputs a signal "DS2" representing a difference in speed (i.e., differentiation) between the drive wheels 24 and 26. The maximum selector 54 passes the faster of the two speed signals "DLS" and "DRS" as a signal "FS". The signals "VS", "DS1", "DS2", and "FS" are received by threshold determining logic 56, which outputs a threshold signal "T" for setting a target value of maximum permissible wheel slip. A fractional portion of the threshold "T" is intended to represent the maximum permissible wheel slip as a percentage of overall drive wheel rotational speed.

A multiplier 58 outputs a signal "VST" that is a product of the vehicle speed "VS" and the threshold "T". The signal "VST" is subtracted from the faster drive wheel speed "FS" in summer 60 to produce a signal "WS" representing excess wheel slip.

The remaining circuit is a proportional integral controller 62, which integrates and scales the wheel slip signal "WS" to form an engine control signal "ECS" for eliminating the excess wheel slip "WS". The proportional integral controller 62 includes the usual features of two gain elements 64 and 66, a limited integrator 68, and a summer 70. Other control logic could be used, including control logic that is specially adapted to different engine output regulators.

Figure 3:
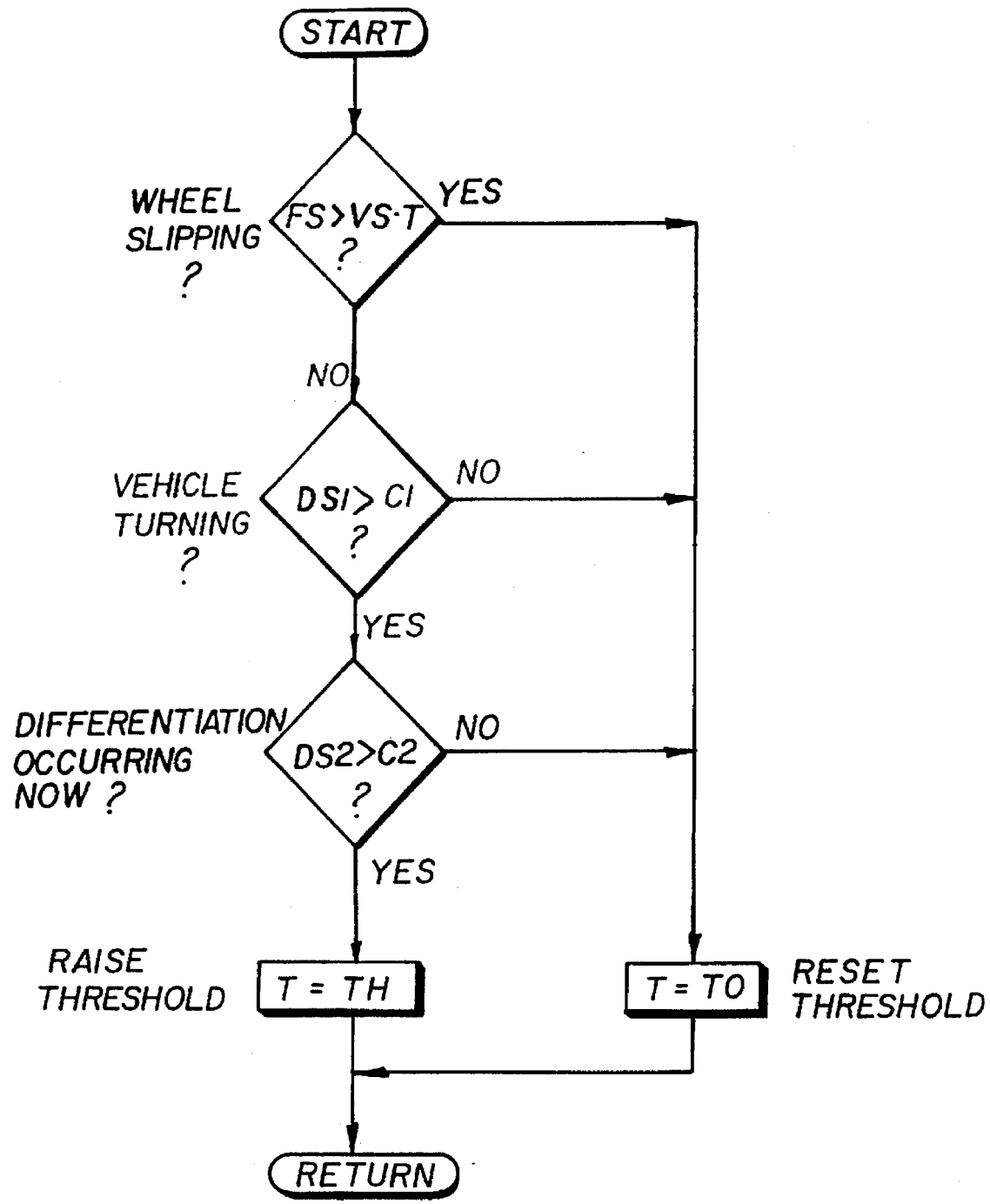
FIG. 3 is a flow chart of a threshold setting logic circuit for increasing the threshold under limited conditions.
Figure 4:
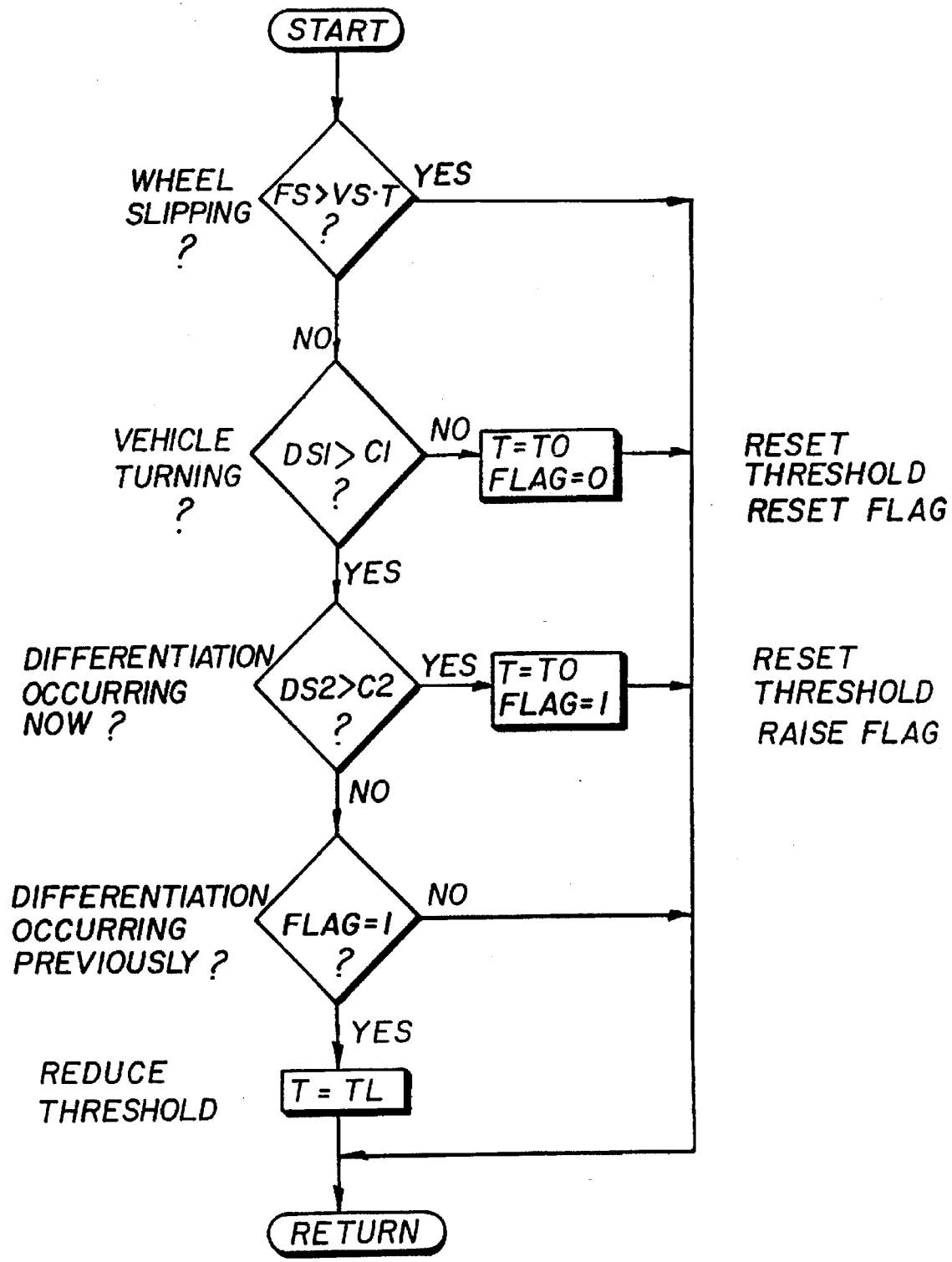
FIG. 4 is a flow chart of a threshold setting logic circuit for decreasing the threshold under limited conditions.
Figure 5:
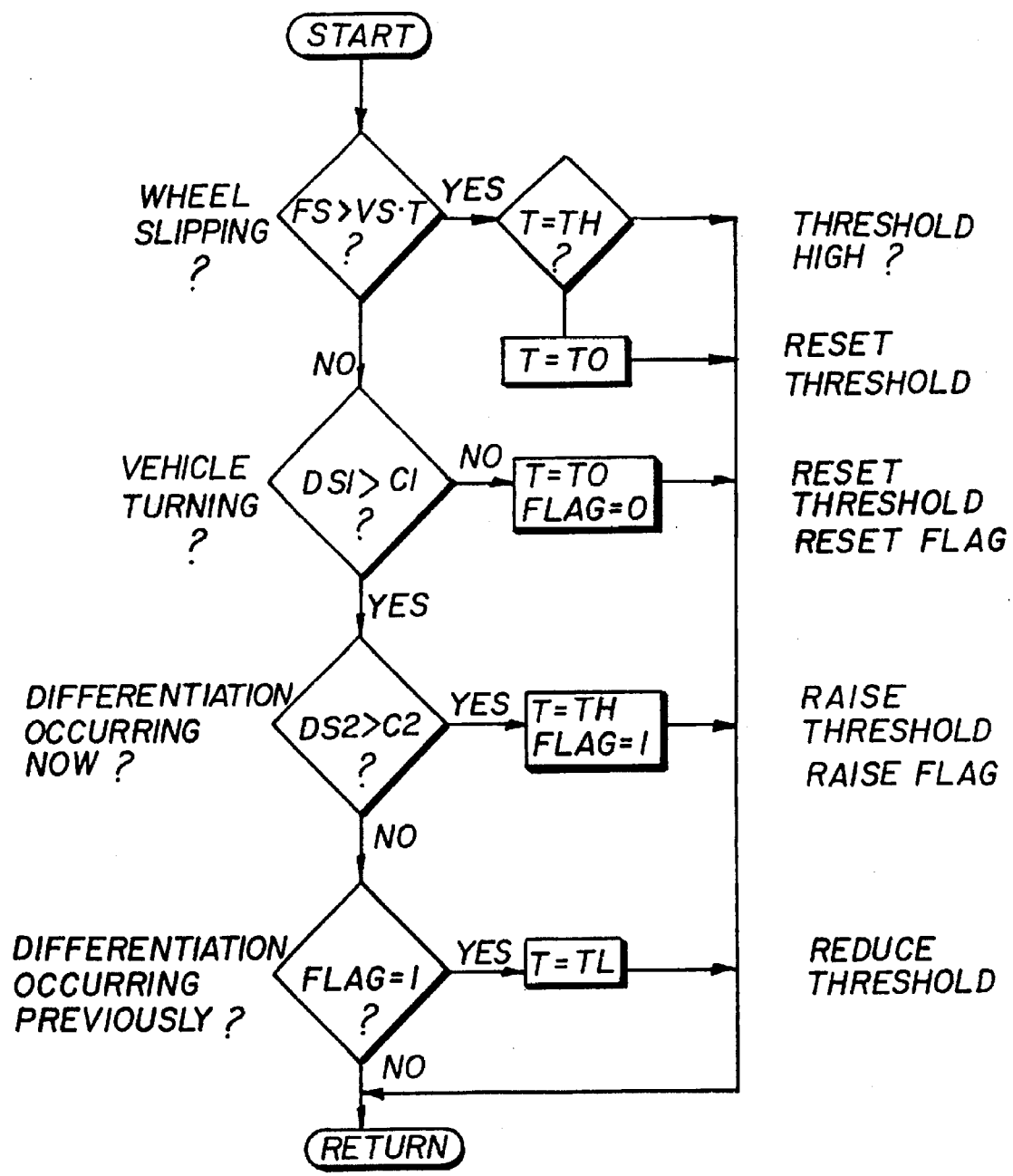
FIG. 5 is a flow chart of a threshold setting logic circuit for both increasing and decreasing the threshold under similar limited conditions.

FIGS. 3–5 illustrate examples of different sets of logic that can be used for the threshold determining logic 56. The logic of FIG. 3 uses the detection of differentiation in a turn to reduce sensitivity of the power limiting system by raising the threshold "T" from a base value "T0" to a higher value "TH". The logic of FIG. 4 uses the cessation of differentiation in a turn to increase sensitivity of the power limiting system by lowering the threshold "T" from the base value "T0" to a lower value "TL". The logic of FIG. 5 further controls sensitivity by using both the detection of differentiation in a turn to raise the threshold "T" from the base value "T0" to the higher value "TH" and the cessation of differentiation in a turn to lower the threshold "T" from the base value "T0" to the lower value "TL".

In FIG. 3, three decision steps 72, 74, and 76 present respective inquiries for identifying limited conditions under which the threshold "T" can be raised from the threshold "T0" to the threshold "TH". The decision step 72 checks for wheel slipping by comparing the faster drive wheel speed "FS" with the product of the vehicle speed "VS" and the threshold "T". The decision steps 74 and 76 check for vehicle turning and drive wheel differentiation by comparing the difference signals "DS1" and "DS2" to respective constants "C1" and "C2", which represent appropriate filtering elements for avoiding spurious detections. The threshold "T" is raised to "TH" only upon the lack of detection of wheel slipping and the detection of both vehicle turning and differentiation. All other conditions restore the threshold "T" to the base value "T0".

The logic of FIG. 4 includes three decision steps 82, 84, and 86, which are similar to decision steps 72, 74, and 76, as well as a fourth decision step 88 that checks the status of a flag representing prior differentiation. The threshold "T" is lowered to "TL" only upon a set of limited conditions which include (a) no wheel slipping, (b) vehicle turning, and (c) the cessation of differentiation within the same turn. The latter condition is represented by a lack of current differentiation following a previous detection of differentiation within the same turn. The threshold "T" is restored to base value "T0" when wheel slipping is not detected and either the turn ends or differentiation restarts.

FIG. 5 includes four decision steps 92, 94, 96, and 98 that combine logic from FIGS. 3 and 4. The same isolated conditions are identified for either raising the threshold "T" to "TH" or lowering the "T" to "TL". However, the threshold "T" is restored to base value "T0" when wheel slipping is detected, and the threshold "T" is raised to "TH" when slipping is not detected and the turn ends.

The base value "T0" can be a fixed value or a variable that is dependent upon detected conditions. For example, the base value "T0" can be lowered as a function of vehicle lateral acceleration to reflect a corresponding reduction in remaining longitudinal traction. The threshold "T" can be raised or lowered relative to the changing base value "T0" to better track prevailing conditions. The incremental change to "TH" or "TL" from the base value "T0" can also be made subject to additional conditions such as vehicle speed and turning radius.

Figure 6:
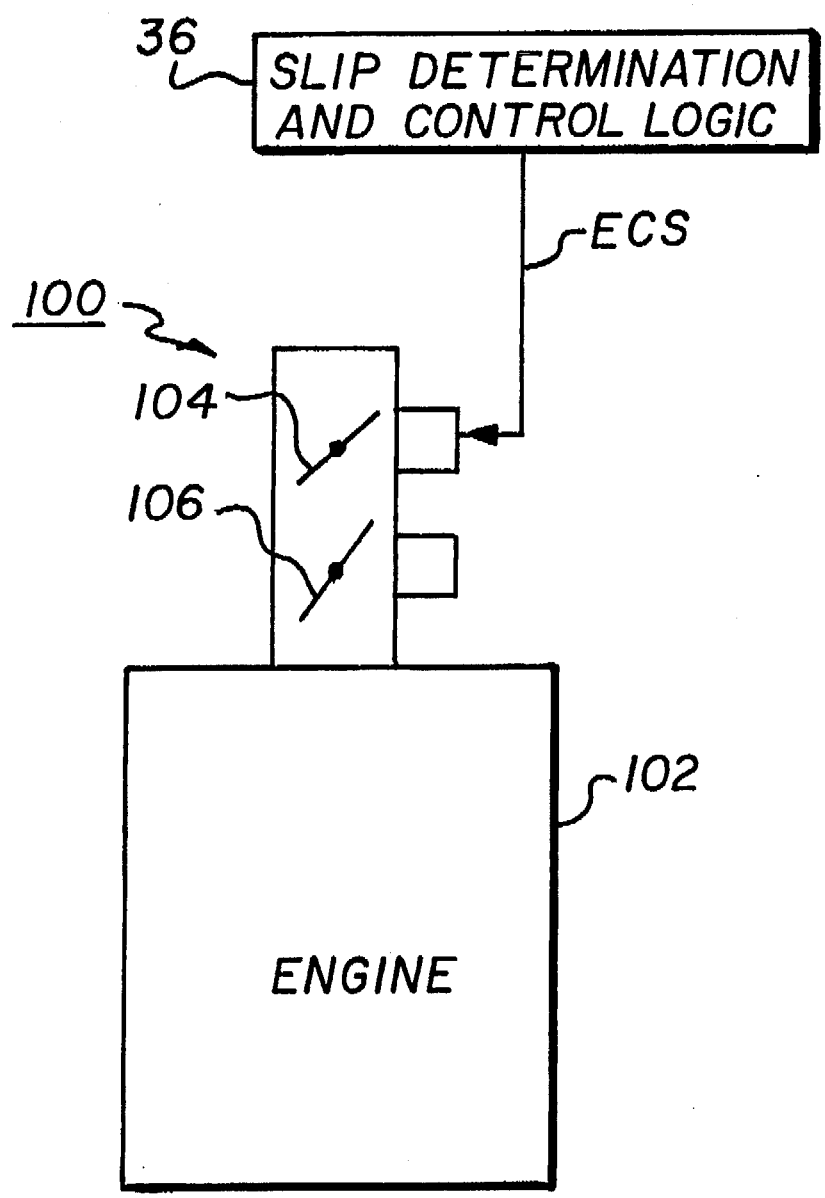
FIG. 6 is a block diagram of an engine control system using a subthrottle actuator to regulate engine output power.

FIG. 6 illustrates an engine control system 100 for an internal combustion engine 102 including a subthrottle actuator 104 connected in series with a main throttle 106. The subthrottle actuator 104 is controlled by the output of the slip determination and control logic 36. However, instead of the lowering threshold "T" in response to the conditions set forth in FIG. 4, the subthrottle actuator 104 is readied or "armed" for responding more quickly to the detection of wheel slipping. This can be done by controlling the subthrottle 104 to track positions of the main throttle 106 so that a much smaller adjustment of the subthrottle 104 is needed to supersede the main throttle 106.

The conditions set forth in FIG. 4 for lowering the threshold "T" can also be used as a basis for initiating calculations relating to the availability of additional traction. At the moment differentiation ceases in a turn, the inside drive wheel has exhausted all of its available traction, but is imparting a multiple of the torque imparted by the outside drive wheel. This information can be used alone or in conjunction with other information for further evaluating traction conditions or for predicting conditions under which wheel slipping is likely to occur.

Assuming that the outside drive wheel has the same traction as the inside drive wheel, considerably more total drive torque can be imparted before both drive wheels would begin slipping together. The additional drive torque is equal to the torque difference between the drive wheels at the moment differentiation ceases. For example, a 2 to 1 bias ratio differential would permit a 50 percent increase in total torque before saturating the supposed traction conditions. However, assuming greater traction of the outside drive wheel, even more drive torque would be required to initiate slipping of the inside wheel alone. The additional torque is a multiple of the total torque represented by the bias ratio. For example, twice as much total drive torque would be required to initiate inside wheel slipping with a 2 to 1 bias ratio differential.

More specific approximations of traction conditions and predictions relating to wheel slip can be made by measuring other vehicle operating conditions such as the total drive torque and vehicle lateral acceleration at the moment differentiation ceases in a turn. The drive torque imparted by the drive wheels can be approximated from such factors as engine speed, throttle position, engine torque map, torque converter slip speed, torque converter map, transmission gear ratio, final drive ratio, and power train efficiency. Lateral acceleration can be estimated from wheel speeds.

These calculations allow further control over power limiting systems by responding preemptively to predicted conditions of wheel slipping. For example, preemptive actions such as lowering the threshold, readying an actuator, or limiting engine output power could be delayed from the moment differentiation ceases in a turn until other conditions relating to wheel slipping are also met.

The bias ratio of the torque proportioning differential can be selected to control the relative amount of torque transfer required to change from a condition of differentiation in a turn to slipping of one or both drive wheels. Higher bias ratios provide earlier warning of limited traction conditions but provide less accurate information concerning the likelihood of imminent wheel slipping.

We claim:

1. A traction control system for improving vehicle performance in turns comprising:

a power limiting system that regulates drive power to a pair of drive wheels and having a plurality of operating modes for responding to changing vehicle operating conditions;

a power distributing system that divides the drive power between the drive wheels and resists relative rotation between the drive wheels for unevenly dividing drive torque between the drive wheels;

sensors for detecting states of (a) vehicle turning, (b) relative rotation between the drive wheels, and (c) wheel slipping of at least one drive wheel; and a logic system responsive to a combination of a detection of vehicle turning and a lack of detection of wheel slipping by altering an operating mode of said power limiting system in accordance with a detected state of relative rotation between the drive wheels.

2. The traction control system of claim 1 in which said operating mode of the power limiting system can be altered between two different operating modes in response to the combination of the detection of vehicle turning and the lack of detection of wheel slipping.

3. The traction control system of claim 2 in which a first of said operating modes enables delivery of additional drive power to the drive wheels and a second of said operating modes provides for relatively limiting the delivery of additional drive power to the drive wheels.

4. The traction control system of claim 3 in which a control signal of said logic system changes said operating mode to said first operating mode in response to a detection of relative rotation between the drive wheels.

5. The traction control system of claim 4 in which wheel slipping is detected as an amount of wheel slip above a threshold.

6. The traction control system of claim 5 in which said threshold is higher in said first operating mode than in said second operating mode.

7. The traction control system of claim 3 in which a control signal for altering said operating mode is responsive to a changing state of relative rotation between the drive wheels.

8. The traction control system of claim 7 in which said control signal changes said operating mode to said second operating mode in response to a detection of a cessation of relative rotation between the drive wheels.

9. The traction control system of claim 8 in which wheel slipping is detected as an amount of wheel slip above a threshold.

10. The traction control system of claim 9 in which said threshold is higher in said first operating mode than in said second operating mode.

11. The traction control system of claim 10 in which said control signal changes said operating mode to said first operating mode in response to a detection of relative rotation between the drive wheels.

12. The traction control system of claim 8 in which said power limiting system controls an actuator for reducing drive power to the drive wheels in response to a signal indicating a detection of wheel slipping.

13. The traction control system of claim 12 in which said second operating mode arms said actuator for responding more quickly to the signal indicating the detection of wheel slipping.

14. The traction control system of claim 13 in which said actuator is a subthrottle arranged in series with a main throttle for regulating air intake into an internal combustion engine and said subthrottle is armed by tracking movements of the main throttle.

15. The traction control system of claim 8 in which said logic system provides for calculating a total drive torque at which wheel slipping is likely to occur based on conditions monitored at the time the cessation of differentiation is detected.

16. The traction control system of claim 15 in which the monitored conditions include the total drive torque delivered to the power distributing system.

17. The traction control system of claim 1 in which said power distributing system is a differential that interconnects the pair of drive wheels for opposite directions of relative rotation and that exhibits frictional resistance to the opposite directions of relative rotation for unevenly dividing drive torque between the drive wheels.

18. The traction control system of claim 17 in which said differential is a torque proportioning differential that develops frictional resistance to the relative rotation between drive wheels proportional to a total torque delivered to the drive wheels.

19. An integrated traction control system for a vehicle comprising:

an engine control system for limiting drive power from an engine;

a differential that divides drive torque unevenly between a pair of drive wheels in response to relative rotation between the drive wheels;

sensors for detecting states of (a) vehicle turning, (b) relative rotation between the drive wheels, and (c) wheel slipping of at least one drive wheel;

a first logic circuit that responds to a detection of wheel slipping by outputting a control signal to the engine control system for limiting drive power from the engine; and a second logic circuit that responds to a detection of vehicle turning and a state of relative rotation between the drive wheels by modifying the control signal between different states of relative rotation.

20. The integrated traction control system of claim 19 in which said control signal is modified in response to a detection of relative rotation between the drive wheels.

21. The integrated traction control system of claim 20 in which said sensors measure wheel slip and said control signal is modified to reduce sensitivity of the engine control system to a given measure of wheel slip in response to the detection of relative rotation between the drive wheels.

22. The integrated traction control system of claim 21 in which wheel slipping is detected as an amount of wheel slip above a threshold.

23. The integrated traction control system of claim 22 in which the sensitivity of the engine control system is reduced by increasing the threshold.

24. The integrated traction control system of claim 19 in which said control signal is modified in response to a detection of a cessation of relative rotation between the drive wheels.

25. The integrated traction control system of claim 24 in which said sensors measure wheel slip and said control signal is modified to increase sensitivity of the engine control system to a given measure of wheel slip in response to the detection of cessation of relative rotation between the drive wheels.

26. The integrated traction control system of claim 25 in which wheel slipping is detected as an amount of wheel slip above a threshold.

27. The integrated traction control system of claim 26 in which the sensitivity of the engine control system is increased by reducing the threshold.

28. The integrated traction control system of claim 19 in which said differential is a torque proportioning differential that develops frictional resistance to relative rotation between drive wheels proportional to a total torque delivered to the drive wheels.

29. A method of improving performance of traction control systems in turns comprising the steps of:

delivering drive power to a power distributing system that divides the drive power between the drive wheels and resists relative rotation between the drive wheels for unevenly dividing drive torque between the drive wheels;

detecting states of (a) vehicle turning, (b) relative rotation between the drive wheels, and (c) wheel slipping of at least one drive wheel;

producing a control signal indicating a detected state of relative rotation between drive wheels in response to a combination of a detection of vehicle turning and a lack of detection of wheel slipping; and changing operating modes of a power limiting system that regulates drive power to the power distributing system in response to a change in the detected state of relative rotation indicated by the control signal.

30. The method of claim 29 in which a first of the operating modes enables delivery of additional drive power to the drive wheels and a second of the operating modes provides for relatively limiting the delivery of additional drive power to the drive wheels.

31. The method of claim 30 in which said step of changing the operating mode includes changing to the first operating mode in response to a detection of relative rotation between the drive wheels.

32. The method of claim 31 in which said step of detecting includes measuring wheel slip and said step of changing to the first operating mode reduces sensitivity of the power limiting system to a given measure of wheel slip.

33. The method of claim 32 in which wheel slipping is detected as an amount of wheel slip above a threshold and sensitivity is reduced by increasing the threshold.

34. The method of claim 30 in which said step of changing the operating mode includes changing to the second operating mode in response to a detection of a cessation of relative rotation between the drive wheels.

35. The method of claim 34 in which said step of detecting includes measuring wheel slip and said step of changing to the second operating mode increases sensitivity of the power limiting system to a given measure of wheel slip.

36. The method of claim 35 in which wheel slipping is detected as an amount of wheel slip above a threshold and sensitivity is increased by decreasing the threshold.

37. The method of claim 34 in which said step of changing to the second operating mode includes reducing power delivered to the power distributing system.

38. The method of claim 34 in which said step of changing to the second operating mode includes calculating a total drive torque at which wheel slipping is expected based on conditions monitored at the time the cessation of differentiation is detected.

39. The method of claim 34 in which said step of changing to the second operating mode includes arming an actuator of the power limiting system for responding more quickly to a detection of wheel slipping.

\* \* \* \* \*